(12) United States Patent
Branstetter

(10) Patent No.: US 6,502,975 B1
(45) Date of Patent: Jan. 7, 2003

(54) THEFT RESISTANT LAMP

(75) Inventor: Cary D. Branstetter, Brookville, IN (US)

(73) Assignee: Grote Industries, Inc., Madison, IN (US)

( * ) Notice: Subject to any disclaimer, the term of this patent is extended or adjusted under 35 U.S.C. 154(b) by 0 days.

(21) Appl. No.: 09/933,378

(22) Filed: Aug. 20, 2001

(51) Int. Cl.$^7$ ................................................ F21V 7/04
(52) U.S. Cl. ...................... 362/549; 362/545; 362/459; 362/546; 362/376; 362/366
(58) Field of Search ................. 362/545, 549, 362/459, 546, 376, 366

(56) References Cited

U.S. PATENT DOCUMENTS

| | | | |
|---|---|---|---|
| 3,244,869 A | * 4/1966 | Buck | |
| 3,620,401 A | 11/1971 | Lund | 220/3.6 |
| 3,939,337 A | 2/1976 | Oda et al. | 240/8.3 |
| 4,118,767 A | * 10/1978 | Urbanek | 362/455 |
| 4,195,330 A | 3/1980 | Savage, Jr. | 362/226 |
| 4,212,051 A | * 7/1980 | Kulik | 362/287 |
| 4,290,098 A | * 9/1981 | Pierson | 362/267 |
| 4,419,722 A | 12/1983 | Bury | 362/396 |
| 4,507,718 A | 3/1985 | Bury | 362/396 |
| 4,791,535 A | 12/1988 | Sclafani et al. | 362/82 |
| 5,193,643 A | 3/1993 | McIntyre | 180/312 |
| 5,475,577 A | 12/1995 | Vanderhoof et al. | 362/368 |
| 5,632,551 A | * 5/1997 | Roney et al. | 362/249 |
| 5,730,522 A | 3/1998 | Wyke et al. | 362/432 |
| 5,820,247 A | * 10/1998 | Schuler | 362/96 |
| 6,062,709 A | * 5/2000 | Cunnien et al. | 362/267 |
| 6,244,736 B1 | 6/2001 | O'Neal | 362/549 |
| 6,302,569 B1 | * 10/2001 | Huang | 362/546 |

* cited by examiner

Primary Examiner—Thomas M. Sember
Assistant Examiner—Jacob Y. Choi
(74) Attorney, Agent, or Firm—Woodard, Emhardt, Naughton, Moriarty & McNett LLP

(57) ABSTRACT

A theft resistant lamp assembly for a vehicle includes a lamp unit and a lens. The lamp unit is adapted to generate light and is enclosed in the lens. The lens has a body portion adapted to transmit light from the lamp and one or more lock tabs. A flange extends from the body portion. Each lock tab is constructed and arranged to resiliently deflect in order to secure the lens to the vehicle.

23 Claims, 8 Drawing Sheets

THEFT RESISTANT LAMP

TECHNICAL FIELD OF THE INVENTION

The present invention generally relates to vehicle lamp assemblies, and more specifically, but not exclusively, relates to a theft resistant lamp assembly.

BACKGROUND OF THE INVENTION

Vehicles, particularly trucks, utilize many replaceable lamps, such as side marker lamps that are installed to clearly mark the boundaries of the tractor-trailer at night and brake lamps. Because these lamps must be replaced on a regular basis when their lamp elements fail, typical lamps are formed as an assembly with a case, lens (usually of plastic), and mounting bracket permanently affixed to the vehicle. Rotation of the lamp assembly upon the bracket in a clockwise manner serves to affix the lamp assembly to a bracket, while rotation of the lamp assembly in a counter clockwise direction allows the lamp assembly to become completely removed from the bracket.

While it is important for the lamp assembly to be removable from the bracket to allow for servicing of failed lamps, such removability also allows for relatively easy theft of the lamp assemblies. Such theft has become a greater concern with the introduction of lamp assemblies utilizing light emitting diodes (LEDs) as illumination elements, as these lamp assemblies are substantially more expensive. Not only does this expense increase the loss associated with the theft of the lamp assembly, it also presents an increased incentive for theft. Efforts to stop theft have been made, such as by riveting the lamp to the vehicle. However, this solution is not practical for all types of lamps, such as grommet mounted type lamps.

Therefore, there is a need for a vehicle lamp that is theft resistant. The present invention is directed towards meeting this need.

SUMMARY OF THE INVENTION

A theft resistant lamp according to one embodiment of the present invention includes a lens and a lamp unit. The lamp unit is adapted to generate light, and the lamp unit is enclosed in the lens. The lens includes a body portion, a flange and at least one lock tab. The body portion is adapted to transmit light from the lamp unit, and the flange extends from the body portion. The lock tab is constructed and arranged to resiliently deflect to secure a mounting member between the flange and the lock tab in order to secure the lens to the mounting member.

A theft resistant lamp lens for a vehicle according to another embodiment of the present invention includes a body portion, an outer flange, a tab support member, and at least one lock tab. The outer flange extends from the body portion, and the tab support member is integrally formed with the body portion. The lock tab is attached to support member, and the lock tab has an engaging surface that faces the outer flange. The lock tab is adapted to resiliently deflect to secure a portion of the vehicle between the engaging surface and the outer flange.

One object of the present invention is to provide an improved lamp assembly system. Related objects and advantages of the present invention will be apparent from the following description, claims, and drawings.

DESCRIPTION OF THE PREFERRED EMBODIMENTS

Figure 1:
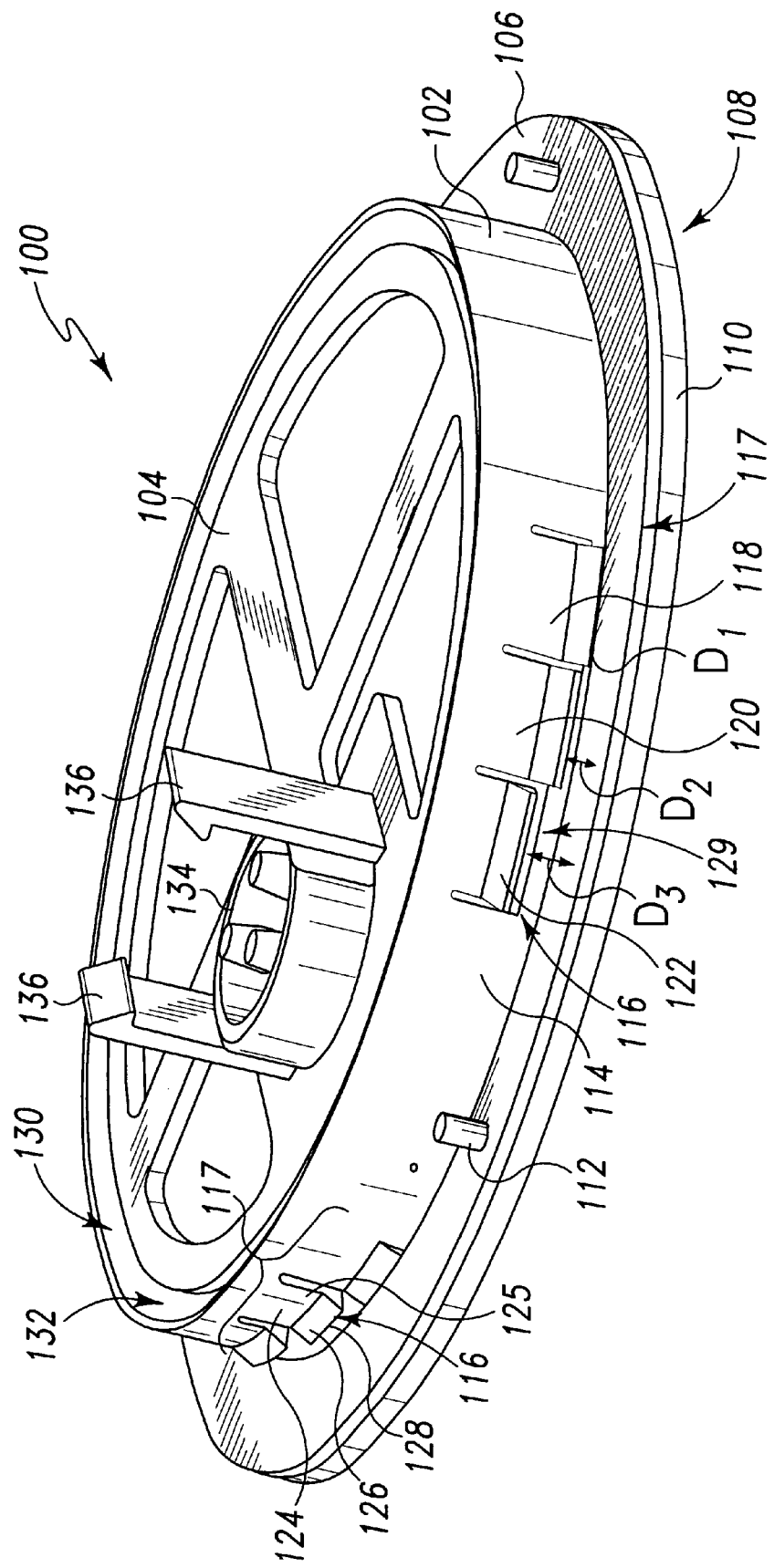
FIG. 1 is a first perspective view of a lamp assembly according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

As discussed herein above, many lamp assemblies are now utilizing LEDs as the illumination element. Because LEDs have an expected life that is longer than that of the vehicle to which they are attached, there is no need to provide for the removability of these lamp assemblies once they are installed on the vehicle. The present invention therefore provides a lamp assembly which does not allow for removal from the vehicle after the lamp assembly has been mounted thereon. Such a configured lamp assembly makes it nearly impossible to steal the lamp assembly off of the vehicle.

Figure 2:
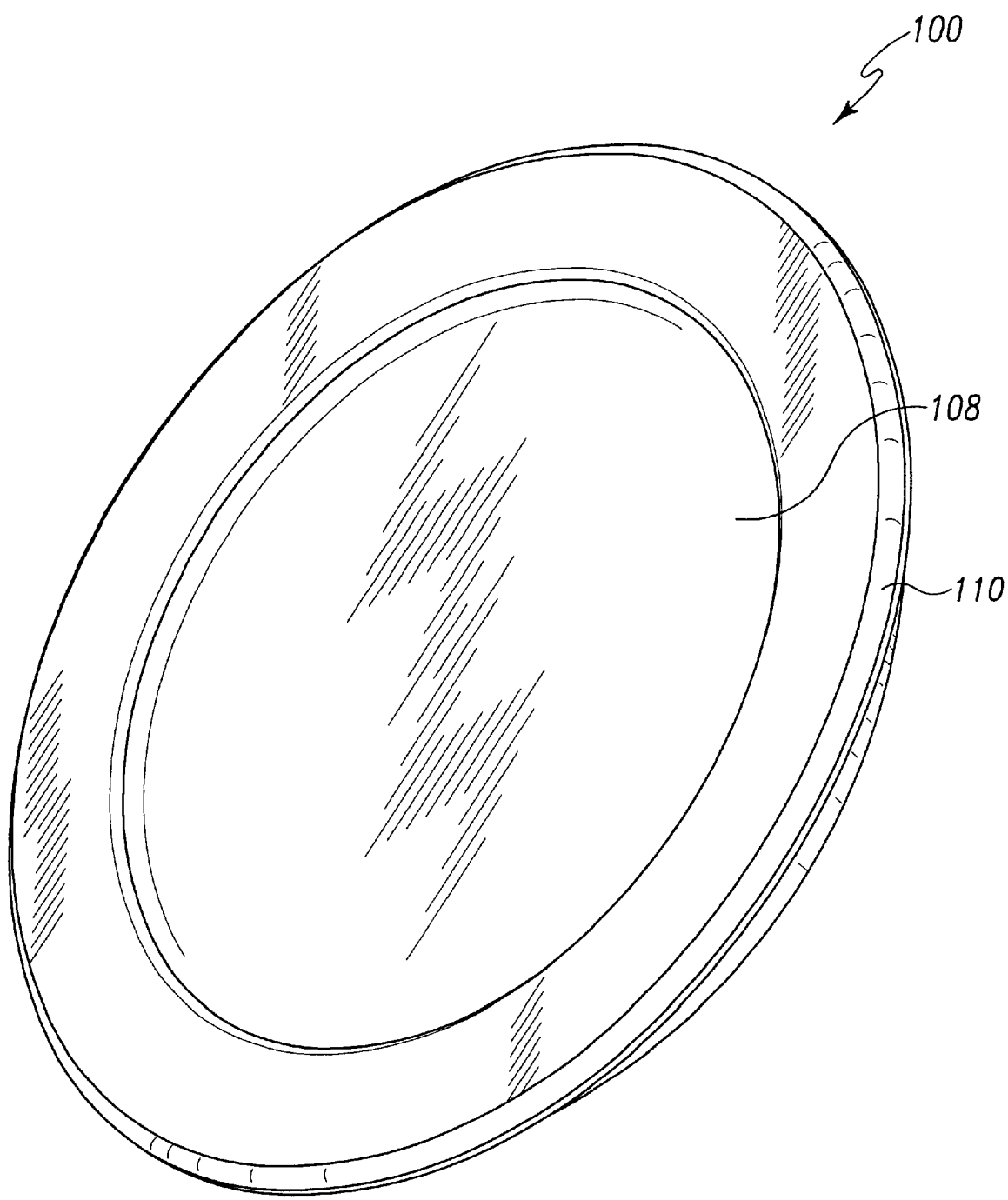
FIG. 2 is a second perspective view of the FIG. 1 lamp assembly.

A lamp assembly 100 according to one embodiment of the present invention is illustrated in FIGS. 1–2. The lamp assembly 100 includes a lens portion 102, a housing 104, and a gasket 106. The lens portion 102 and the housing 104 according to one embodiment of the present invention are made of plastic, and the gasket 106 is made of an elastomeric material, such as rubber. It should be appreciated, however, that elements of these components of the lamp assembly 100 can be made of other materials, such as metal and/or glass. In the illustrated embodiment, the lamp assembly 100 has a generally cylindrical shape. As should be understood, the lamp assembly 100 can have a different shape than the one shown.

The lens portion 102 includes a domed body portion 108 through which lamp light shines. The body portion 108 is translucent and/or transparent such that light can be transmitted through the body portion 108. An outer circumferential flange 110 extends outwardly from the body portion 108. In the illustrated embodiment, the outer flange 110 has an annular shape. The outer flange 110 has one or more rotation prevention pins 112 extending therefrom. As illustrated in FIG. 1, the lens portion 102 includes a tab support member 114 that extends substantially perpendicular to the outer flange 110. The tab support member 114 supports one or more lock tabs 116, which are used to secure the lamp assembly 100 to a vehicle. These lock tabs 116 are grouped in sets 117 that are preferably equidistantly disposed around the lens portion 102. In the illustrated embodiment, these sets 117 of lock tabs 116 include first lock tabs 118, second lock tabs 120, and third lock tabs 122. Each of the lock tabs 116 includes a connection portion 124 that is connected to support member 114 and extends towards the outer flange 110. The tabs 116 are resiliently attached to the support member 114 and match the outer contour of the support member 114. At free end 125, which is proximal to the flange 110, the connection portion 124 has an angled wall engaging portion 126 with an engaging surface 128 that faces flange 110. A gap 129 is formed between the engaging surface 128 and flange 110. The first 118, second 120, and third 122 lock tabs have their engaging surfaces 128 spaced at different distances D1, D2 and D3, respectively, from the flange 110 so as to be able to engage a range wall thicknesses.

The lock tab support member 114 defines a housing receiving cavity 130 into which the housing 104 is received. The housing 104 is attached to the lens portion 102, such as with glue or ultrasonic welding. A deflection cavity 132 is formed between the lock tab support member 114 and housing 104 so as to allow the lock tabs 116 to inwardly deflect in order to fit into an opening of the vehicle. The lamp housing 104 includes a connector 134, which is used to secure an electrical harness that powers the lamp assembly 100. The lamp connector 134 includes a pair of harness connecting tabs 136, which are used to secure the harness to the lamp assembly 100.

Figure 3:
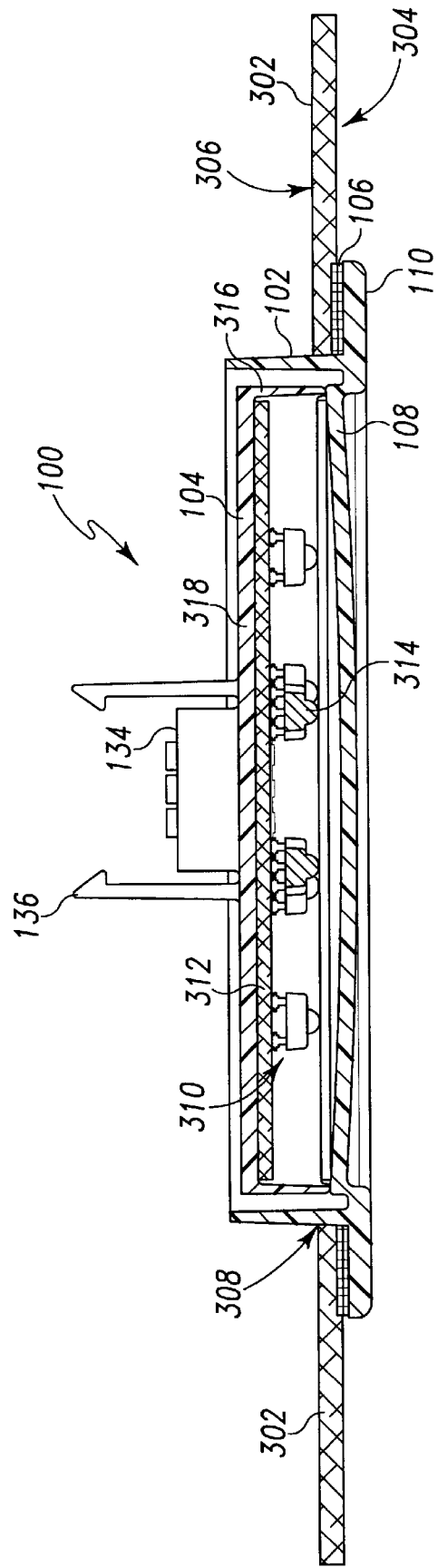
FIG. 3 is a first cross-sectional view of the FIG. 1 lamp assembly mounted to a mounting member.

The lamp assembly 100 when attached to a mounting member 302 of the vehicle is illustrated in FIG. 3. By way of nonlimiting example, the mounting member 302 can include bumpers, trailer walls, vehicle walls and lighting brackets. The mounting member 302 has an outside surface 304, which is exposed on the vehicle, and an opposite inside surface 306. As shown, the lamp assembly 100 is received in a lamp opening 308 defined in the mounting member 302. A lamp unit 310 is disposed inside the housing 104. The lamp unit 310 includes a printed circuit board 312 and one or more LEDs 314 that are attached to the printed circuit board 312. It will be appreciated that LEDs 314 may be replaced with any lighting element, such as incandescent bulbs or the like. Through the printed circuit board 312, the LEDs 314 are operatively coupled to the harness connector 134, which supplies power to the LEDs 314. The housing 104 includes an outer wall 316 that extends from a base 318. The housing 104 along with the lens portion 102 form an enclosure for the lamp unit 310.

Figure 4:
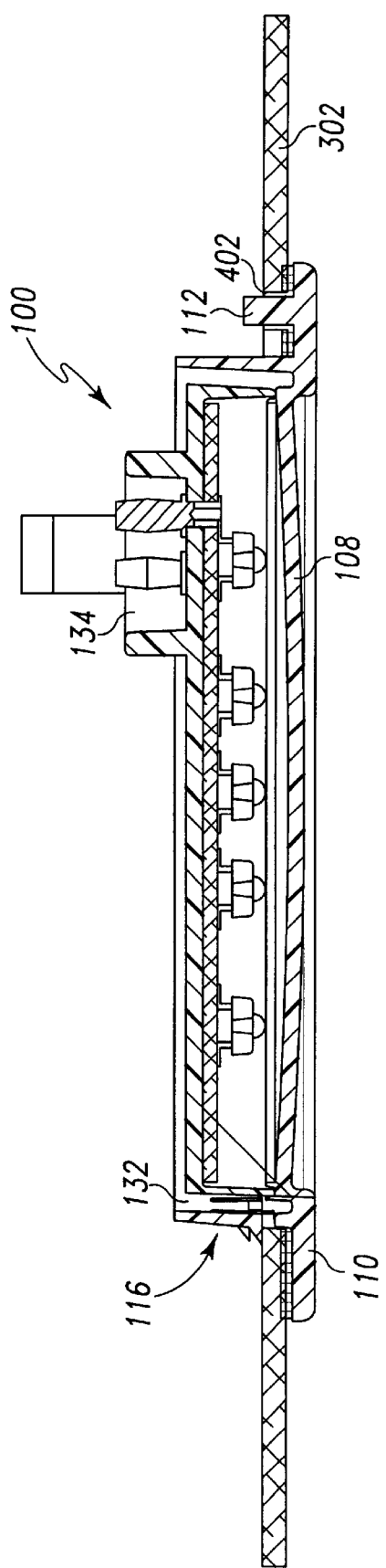
FIG. 4 is a second cross-sectional view of the FIG. 1 lamp assembly mounted to the mounting member.
Figure 5:
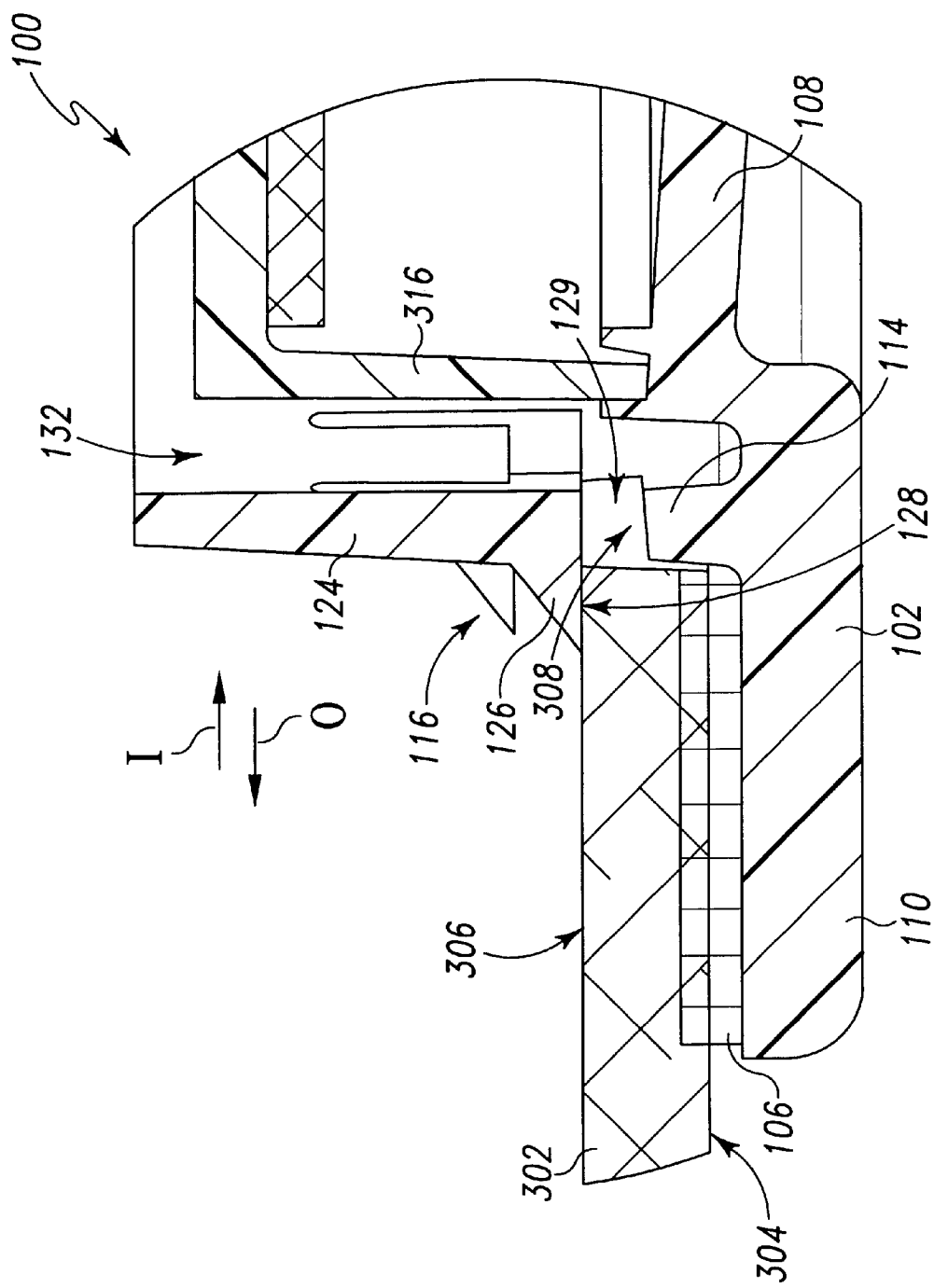
FIG. 5 is an enlarged view of a portion of the lamp assembly and mounting member shown in FIG. 4.

As shown in FIG. 4, the vehicle member 302 has at least one pin receiving hole 402 in which rotation prevention pin 112 is inserted during assembly. The pin 112 prevents the lamp assembly 100 from being rotated. An enlarged view of a portion of the lock tab 116 attached to the mounting member 302 is shown in FIG. 5. During insertion of the lamp assembly 100 into the lamp receiving hole 308 in member 302, the angled portion 126 engages the outer surface 304 of the vehicle member 302. As the lamp assembly 100 is inserted, the angled portion 126 presses against the outside surface 304 so as to cause the lock tab 116 to deflect in a radially inward direction I into the deflection cavity 132. Once the lamp assembly 100 is inserted into opening 308, the resilient lock tab 116 moves in a radially outward direction O to return to its original position. Once fully inserted, the engaging surface 128 of the lock tab engages the inside surface 306 of the vehicle member 302 so as to prevent the lamp assembly 100 being removed from the vehicle member 302. As illustrated in FIG. 5, the vehicle member 302 and gasket 106 are pressed between the engaging surface 128 of the lock tab 116 and the circumferential flange 110.

The vehicle member 302 is typically closed on the backside by a middle enclosure that is riveted to the vehicle. This makes it practically impossible for a person to remove the lamp assembly 100 without damage. The thief would have to break these rivets to access the backside of the lamp assembly 100 and compress the lock tabs 116 in the radially inward direction I in order to remove the lamp assembly 100 without damage. The difficulty of this operation is likely to deter theft of the lamp assembly 100. Front-side removal of the lamp assembly 100 is likewise difficult. Due to the resilient nature of the lock tabs 116, the lock tabs 116 automatically secure the lamp assembly 100 to the mounting member 302. After lamp assembly 100 is secured, the flange 110 prevents the thief from jimmying the lock tabs 116. With the lock tabs 116 extending towards the flange 110, the thief is also unable to deflect the lock tabs 116 by pushing them against the vehicle member 302. The lock tab support wall 114 prevents the thief from moving the lamp assembly 100 from side-to-side so as to be able to disengage the lock tabs 116. In the illustrated embodiment, the body portion 108, the outer flange 110, the support member 114, and the tabs 116 of the lens portion 102 are integrally formed together. With this integral construction, if one these components of the lens portion 102 is damaged, the lamp assembly 100 is rendered practically unusable. The staggered construction of the first 118, second 120 and third 122 lock tabs also provide added security. For example, the second 120 and third 122 lock tabs act as back ups if the first lock tabs 118 are disengaged. In addition, the staggered construction of the lock tabs 116 ensures that the assembly 100 can accommodate a wide range of thickness of vehicle member 302 and is thus tightly secured to the vehicle member 302. These features among others deter theft of the lamp assembly 100.

Figure 6:
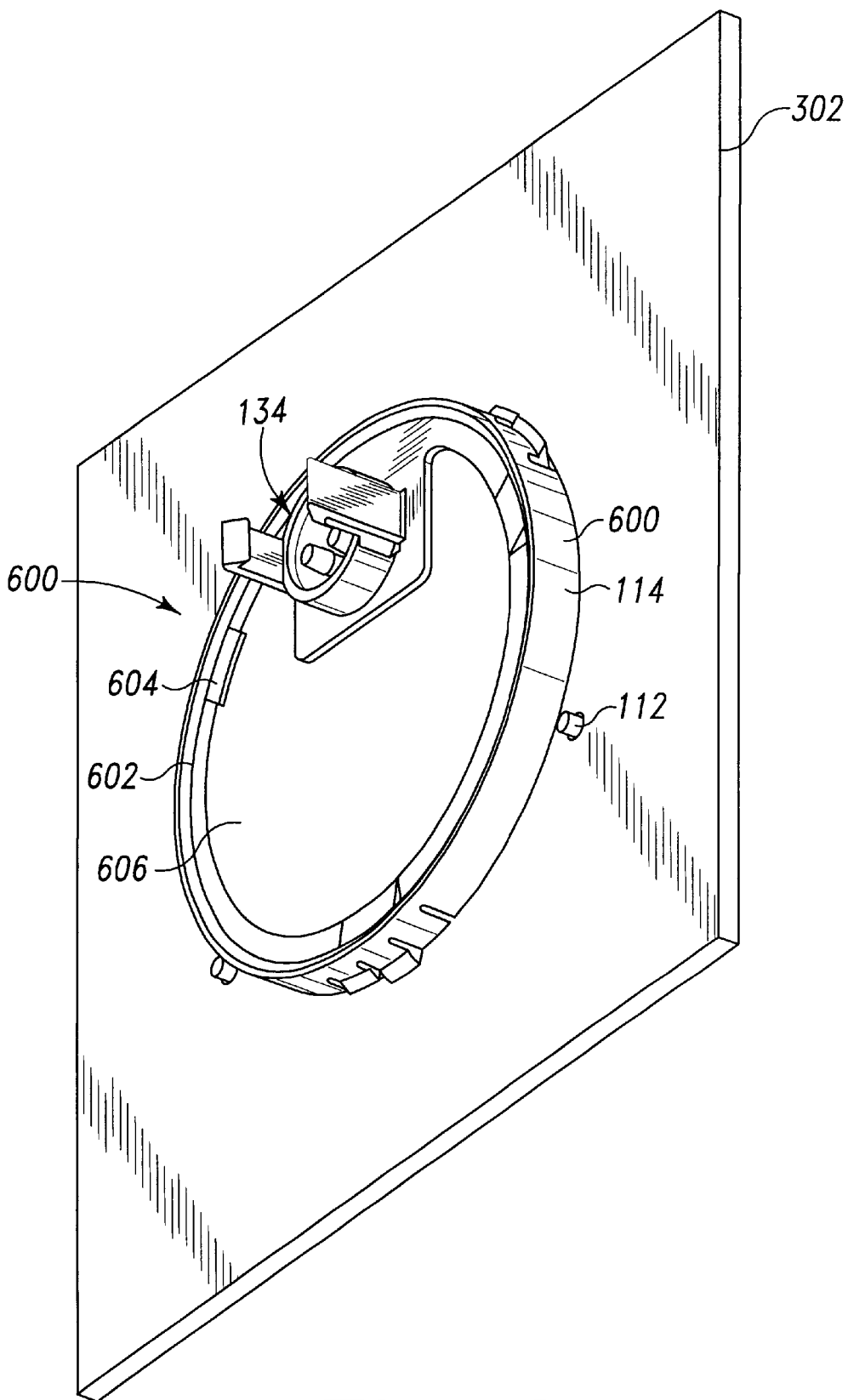
FIG. 6 is a first perspective view of a lamp assembly according to another embodiment of the present invention mounted to a mounting member.
Figure 7:
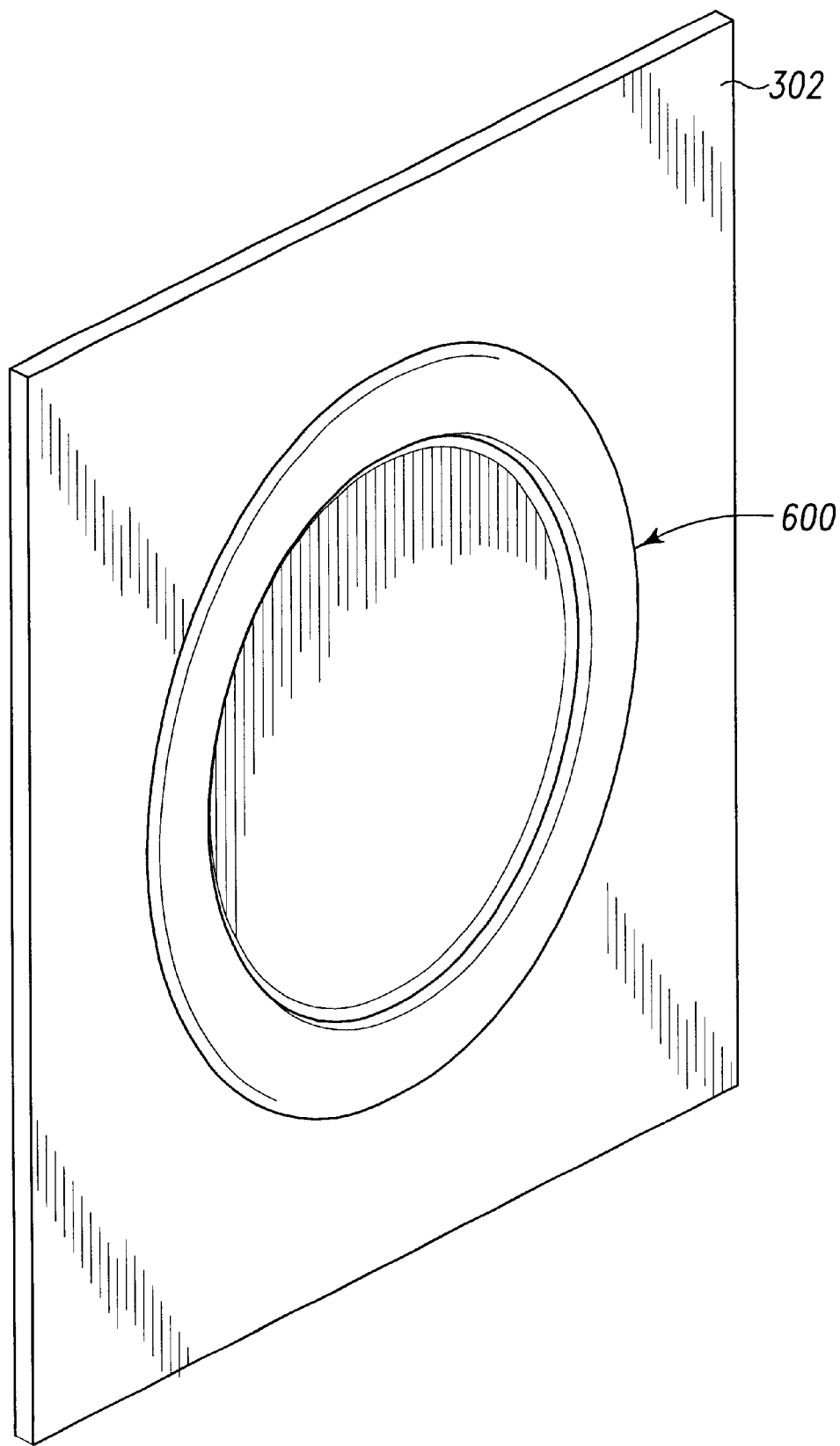
FIG. 7 is a second perspective view of the FIG. 6 lamp assembly mounted to the mounting member.
Figure 8:
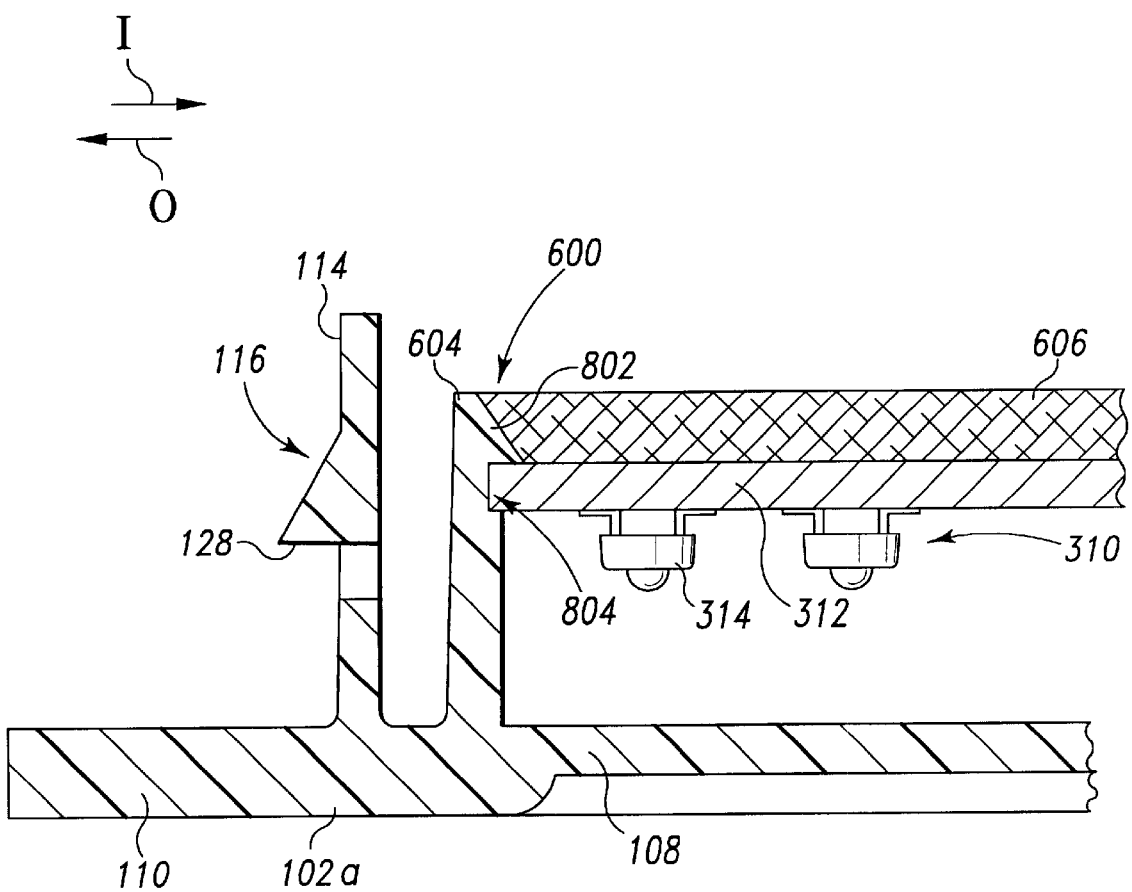
FIG. 8 is a cross-sectional view of the FIG. 6 lamp assembly.

A lamp assembly 600 according to another embodiment of the present invention is illustrated in FIGS. 6–8. As shown, the lamp assembly 600 according to this embodiment includes several of the same components as lamp assembly 100 with the exception that lamp assembly 600 does not include the housing 104. The lamp assembly 600 includes a lens portion 102a with circumferential flange 110, which extends from body portion 108 and lamp unit 310. The lens portion 102a further includes tab support member 114 and one or more lock tabs 116, which extend from the support member 114 toward the flange 110. In the same fashion as described above, the lock tabs 116 are adapted to engage the vehicle mounting member 302. In the illustrated embodiment, the lens portion 102a has an inner wall 602 that includes a circuit board engaging leg 604. The circuit board engaging leg 604 is adapted to secure the lamp unit 310 to the lens 102a. After the lamp unit 310 is secured, an epoxy layer 606 is applied over the printed circuit board 312 in order to hermetically seal the lamp unit 310. As illustrated in FIG. 8, leg 604 includes a tapered portion 802 against which the lamp unit 310 is inserted and a board receiving channel 804 that is adapted to hold the printed circuit board 312. Leg 604 is flexible so as to allow the lamp unit 310 to be inserted and secured thereto. During assembly, the printed circuit board 312 presses against the tapered portion 802, which causes leg 604 to deflect in the radially outward direction O. Once the circuit board 312 is received in the channel 804, leg 604 returns to its original undeflected position so as to secure the printed circuit board 312. Lamp assembly 600 is secured to the mounting member 302 in the same manner as described above for lamp assembly 100.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A theft resistant lamp assembly, comprising:
   a lamp unit adapted to generate light; and
   a lens in which said lamp unit is enclosed, said lens including
   a body portion adapted to transmit light from said lamp unit,
   a flange outwardly extending from said body portion,
   a tab support member attached to said body portion and
   a lock tab having a connection portion resiliently attached to said tab support member, said connection portion having a free end that faces said outer flange, said lock tab being constructed and arranged to resiliently deflect to secure a mounting member between said flange and said lock tab in order to secure said lens to the mounting member.

2. The assembly of claim 1, wherein said lamp unit includes at least one light emitting diode.

3. The assembly of claim 2, wherein:
   said lamp unit includes a circuit board on which said light emitting diode is mounted; and
   said lens includes a circuit board leg adapted to secure said circuit board to said lens.

4. The assembly of claim 3, further comprising epoxy provided on said circuit board to seal said circuit board with said lens.

5. The assembly of claim 1, further comprising a lamp housing coupled to said lens, wherein said lamp unit is housed between said housing and said lens.

6. The assembly of claim 5, wherein said housing is glued to said lens.

7. The assembly of claim 5, wherein said housing includes a connector adapted to secure an electrical harness.

8. The assembly of claim 1, wherein said flange has at least one pin extending therefrom, said pin being adapted to minimize rotation of said lens when secured to the mounting member.

9. The assembly of claim 1, wherein said lens has a cylindrical shape.

10. The assembly of claim 1, wherein said lock tab includes an angled mounting member engaging portion at said free end.

11. The assembly of claim 1, wherein:
    said lock tab includes a first engaging surface adapted to engage the mounting member, said first engaging surface being spaced a first distance from said flange; and
    said lens includes a second lock tab having a second engaging surface, said second engaging surface being spaced a second distance from said flange that is greater than said first distance.

12. The assembly of claim 1, further comprising a gasket provided on said flange adapted to seal against the mounting member.

13. The assembly of claim 1, wherein said body portion, said support member and said lock tab are integrally formed together.

14. The assembly of claim 1, wherein said lens is made of plastic.

15. A theft resistant lamp lens for a vehicle, comprising:
    a body portion adapted to transmit light;
    an outer flange extending from said body portion;
    a tab support member integrally formed with said body portion; and
    a lock tab extending from said support member towards said outer flange, said lock tab having a free end detached from said support member, said free end having an engaging surface that faces said outer flange, said lock tab being adapted to resiliently deflect from said support member to secure a portion of the vehicle between said engaging surface and said outer flange.

16. The lens of claim 15, wherein:
    said flange has an annular shape;
    said support member has a cylindrical shape; and
    said body portion and said support member define a cavity adapted to house a lamp.

17. The lens of claim 15, wherein said flange has at least one pin extending therefrom, said pin being adapted to minimize rotation of said lens when secured to the vehicle.

18. The lens of claim 15, further comprising a circuit board leg extending from said body portion, said circuit board leg being adapted to secure a circuit board to said lens.

19. The lens of claim 15, wherein:
    said lock tab includes a connection portion connected to said tab support member; and
    said free end includes an angled engaging portion.

20. A theft resistant lamp assembly, comprising:
    a lamp unit adapted to generate light;
    a lens in which said lamp unit is enclosed, said lens including
    a body portion adapted to transmit light from said lamp unit,
    a flange outwardly extending from said body portion,
    a tab support member attached to said body portion and
    a lock tab extending from said tab support towards said flange, said lock tab having a free end that faces said outer flange, said lock tab being constructed and arranged to resiliently deflect to secure a mounting member between said flange and said lock tab in order to secure said lens to the mounting member; and
    wherein said lock tab includes a connection portion connected to said tab support member and an angled mounting member engaging portion at said free end.

21. The assembly of claim 20, wherein said flange has at least one pin extending therefrom to minimize rotation of said lens when secured to the mounting member.

22. A theft resistant lamp assembly, comprising:
    a lamp unit adapted to generate light;
    a lens in which said lamp unit is enclosed, said lens including
    a body portion adapted to transmit light from said lamp unit,
    a flange outwardly extending from said body portion,
    a tab support member attached to said body portion and
    a lock tab extending from said tab support towards said flange, said lock
    tab having a free end that faces said outer flange, said lock tab being constructed and arranged to resiliently deflect to secure a mounting member between said flange and said lock tab in order to secure said lens to the mounting member;
    wherein said lock tab includes a first engaging surface adapted to engage the mounting member, said first engaging surface being spaced a first distance from said flange; and wherein said lens includes a second lock tab having a second engaging surface, said second engaging surface being spaced a second distance from said flange that is greater than said first distance.

23. A theft resistant lamp lens for a vehicle, comprising:

a body portion adapted to transmit light;

an outer flange extending from said body portion;

a tab support member integrally formed with said body portion;

a lock tab extending from said support member towards said outer flange, said lock tab having a free end with an engaging surface that faces said outer flange, said lock tab being adapted to resiliently deflect to secure a portion of the vehicle between said engaging surface and said outer flange; and a circuit board leg extending from said body portion, said circuit board leg being adapted to secure a circuit board to said lens.

\* \* \* \* \*